Inventor:
Raoul Louis André Delaye
By
Attorney

April 14, 1931. R. L. A. DELAYE 1,800,284
DRAFT AND LIFTING DEVICE FOR AGRICULTURAL TRACTORS
Filed Jan. 25, 1929 2 Sheets-Sheet 2

Inventor:
Raoul Louis André Delaye
By
Attorney.

Patented Apr. 14, 1931                                                      1,800,284

UNITED STATES PATENT OFFICE

RAOUL LOUIS ANDRÉ DELAYE, OF CREST, FRANCE, ASSIGNOR TO SOCIETE A RESPONSABILITE LIMITEE R. DELAYE & CIE., OF CREST, FRANCE, A FIRM OF FRANCE

DRAFT AND LIFTING DEVICE FOR AGRICULTURAL TRACTORS

Application filed January 25, 1929, Serial No. 334,942, and in France February 6, 1928.

This invention relates to a mechanism for connecting a plough or cultivator to a tractor, said mechanism comprising draft gear adjustable in height, and lifting gear by which the plough can be lifted clear of the ground when the same is not required for work, in order to permit the use of a wheelless plough.

Figure 1:
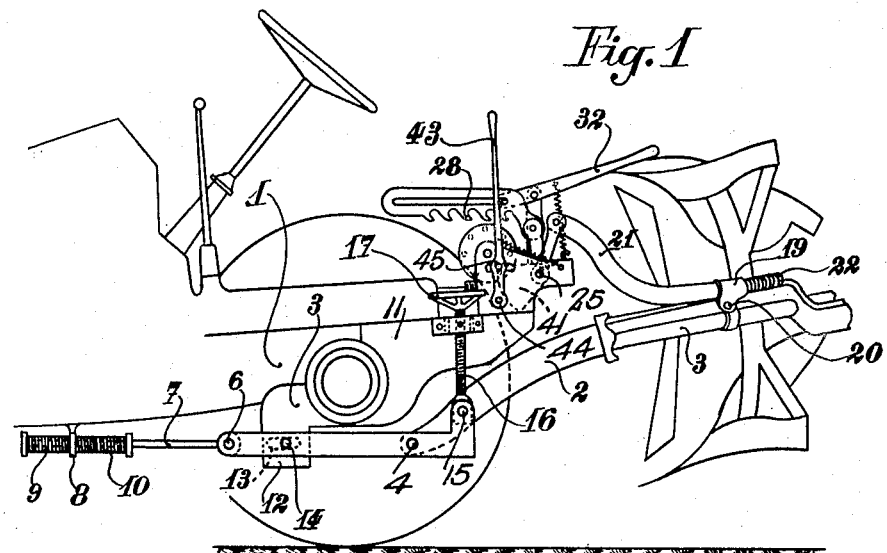
Fig. 1 is a side view of the mechanism adapted to a tractor of standard construction and comprising a reversible plough, which is shown lifted.
Figure 2:
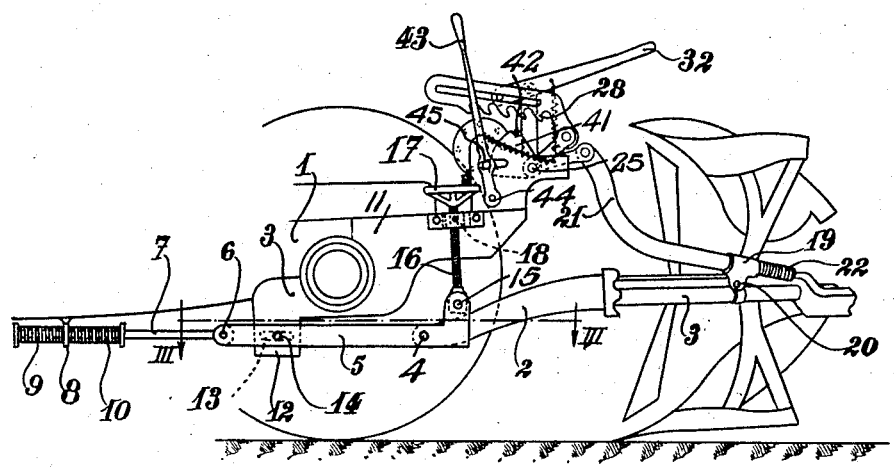
Fig. 2 is a similar view, the plough resting on the ground.

In Figs. 1 and 2, only the rear part of the tractor 1 is represented and the near wheel is supposed removed.

The draft gear (Figs. 1, 2 and 3) comprises a forked member 2 secured to the plough 3. Each arm of member 2 is connected by a pin 4 to a double bar 5 which is, in turn, pivotally connected at 6 to a rod 7. The latter passes through a lug 8 secured to the tractor frame and is provided with buffer springs 9 and 10, as shown, which provide an elastic connection between the tractor and the draft gear.

Figure 3:
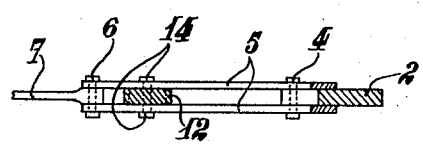
Fig. 3 is a partial section on line III—III of Fig. 2 showing the draft gear.

A plate 11 is secured to each side of the tractor. This plate is provided with a lug 12, projecting downwardly between the two members of the double bar 5 (Fig. 3). This lug is provided with a longitudinal slot 13 through which a pin 14 secured to both members of bar 5 passes.

As shown in Figs. 1 and 2, at the rear end of the double bar 5 is a vertical extension to which is pivotally connected at 15 a screw 16 provided with a hand-wheel 17, this screw 16 extending through a nut 18 which is pivotally secured to the plate 11.

This gear permits of adjusting the depth of work of the plough, by means of the hand-wheel 17, without stopping the tractor. The springs 9 and 10 prevent excessive strains during working.

A collar 19 is pivotally secured at 20 to the plough 3, and the lifting bar 21 for the plough passes freely through this collar 19 and is elastically connected therewith by means of a spring 22 (Figs. 1 and 2).

Figure 5:
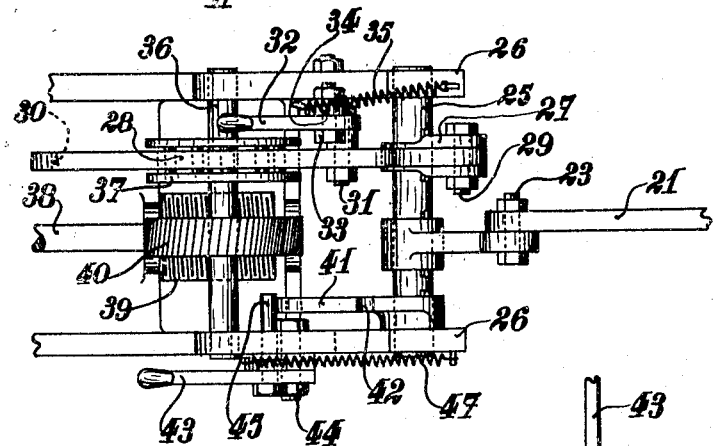
Fig. 5 is a plan view of Fig. 4.
Figure 6:
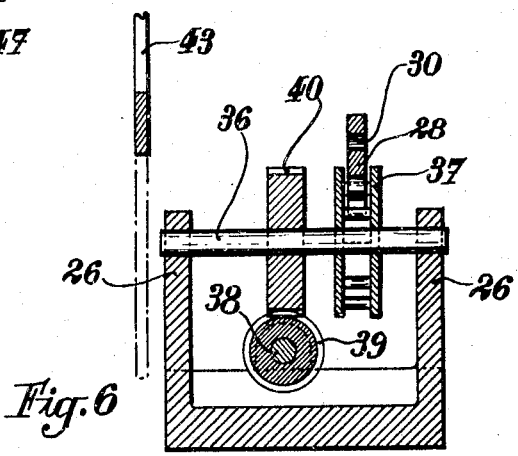
Fig. 6 is a section on line VI—VI of Fig. 4.

The other end of bar 21 (Figs. 4, 5 and 6) is pivoted at 23 to a lever 24 keyed on a shaft 25 supported by a frame 26 fixed at the rear of tractor 1. A second lever 27 is also keyed on shaft 25 and a rack 28 is pivoted at 29 to this second lever.

The rack 28 is provided with a long guide slot 30 through which passes a pin 31 secured at the lower end of a hand-lever 32 pivoted at 33 to a supporting arm 34 secured to the frame 26. A spring 35 acts on lever 32 to bring the same to the position shown in Figs. 1 and 2.

Figure 4:
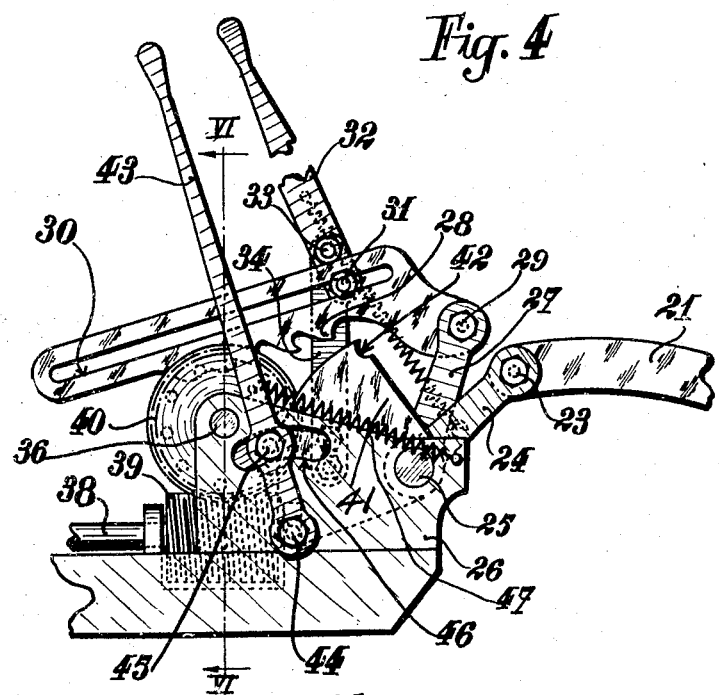
Fig. 4 is a side view of the lifting gear drawn to an enlarged scale, the parts being shown at the beginning of the lifting movement.

Rotatably mounted in frame 26 is a shaft 36 on which is keyed a pinion 37 adapted to co-operate with the rack 28 when the same is lowered by means of the lever 32 to the position shown in Fig. 4. This shaft 36 is driven by the motor of the tractor through any suitable transmission gearing. The tractor can be provided with a shaft projecting from the rear of the usual gear box and adapted to carry a pulley or the like to permit the use of the tractor as a driving motor for various agricultural machines. When such is the case, this shaft 38 (Figs. 4 to 6) or, a shaft connected to the end of the same, is provided with a worm 39 meshing with a worm-wheel 40 keyed on shaft 36.

On the shaft 25 is also keyed a sector 41 provided with a notch 42 on its upper radial edge. A lever 43 is pivoted at 44 to the frame 26 and carries a pin 45 which passes freely through a curved slot 46 provided in the frame 26. A spring 47 acts on lever 43 and tends to turn same clockwise so as to press the pin 45 against the periphery of the sector 41.

The working of the mechanism is as follows:

In the position shown in Fig. 2, the plough 3 rests on the ground and works the soil, the depth of the work being adjustable by means of the wheels 17 as previously described.

To lift the plough, the operator moves the lever 32 into the position shown in Fig. 4. The rack 28 is thus lowered and meshes with pinion 37 which moves the rack forward whereby the shaft 25 is turned by the arm 27 and pulls on the bar 21, and the plough is lifted. The teeth of rack 28 are preferably given the shape illustrated which ensures perfect engagement of the parts even if the lever 32 is released.

When the rotation of the shaft 25 is sufficient the pin 45 will have slid over the curved edge of the sector 41 and become engaged in the notch 42 the rear end of the toothed part of rack 28 will be engaged on the pinion 37 and as soon as the last tooth of the rack is disengaged from pinion 37 the lever 32 returns to its normal position under the action of spring 35 and the rack is lifted by the pin 31, the shaft 25 being held stationary since the sector 41 abuts against the pin 45 engaged in the notch 42. The parts thus assume the position shown in Fig. 1.

To release the plough, it is only necessary to turn lever 43 anticlockwise to disengage the pin 45 from the notch 42, as will be readily understood.

The spring 22 acts as a buffer-spring and prevents shocks to the plough.

What I claim as my invention and desire to secure by Letters Patent of the United States is:—

1. Mechanism for connecting a plough or the like to a tractor, comprising draft gear embodying draft rods elastically connected with the tractor; means for adjusting the height of the rear part of said draft gear and gear adapted to lift the plough from the ground.

2. Mechanism for connecting a plough or the like to a tractor, comprising draft gear, said draft gear embodying a forked member secured to the plough, guided draft bars pivoted to said forked member at the bifurcated end thereof, draft rods pivoted to said draft bars and elastically connected with the tractor; means for adjusting the height of the rear ends of said draft bars and lifting gear for lifting the plough from the ground.

3. In a device as claimed in claim 2, a draft gear comprising a forked member secured to the plough; draft bars pivoted to both bifurcated ends of said forked member, each of said bars being formed of two parallel elements spaced apart, lugs on both sides of the tractor at the rear thereof, said lugs projecting between the elements of said draft bars and being provided with an elongated substantially horizontal slot, a pin secured to both elements of each of said draft bars and passing through said slot to form a guide for its bar, draft rods pivoted to said draft bars at the fore ends thereof; lugs secured to the tractor and receiving said draft rods; and spring means elastically connecting said draft rods with said lugs.

4. Mechanism for connecting a plough or the like to a tractor, comprising draft gear to which the plough is pivotally connected; a lifting rod pivoted to said plough; a rack mechanically connected with said lifting rod; a pinion rotatably supported by the tractor and adapted to cooperate with said rack; means for rotating said pinion; means for guiding said rack, said means being adjustable in position to permit of bringing said rack into engagement with said pinion whereby the plough is lifted from the ground; means for maintaining said lifting rod when the plough is in its lifted position; means for guiding the rack comprising a guiding pin extending through an elongated slot in said rack in a direction substantially parallel to the toothed edge thereof; a lever to which said guiding pin is secured, said lever being pivoted to a frame secured to the tractor; and spring means acting on said lever to bring the same into such position that the rack is out of engagement with its driving pinion.

In testimony whereof I affix my signature.

RAOUL LOUIS ANDRÉ DELAYE.